(12) United States Patent
Seward

(10) Patent No.: US 7,808,724 B2
(45) Date of Patent: Oct. 5, 2010

(54) SPECTROSCOPY LENS FOR TELECENTRIC SENSOR

(76) Inventor: George H. Seward, 20 Central St., Arlington, MA (US) 02476

( * ) Notice: Subject to any disclaimer, the term of this patent is extended or adjusted under 35 U.S.C. 154(b) by 10 days.

(21) Appl. No.: 12/333,488

(22) Filed: Dec. 12, 2008

(65) Prior Publication Data
US 2009/0251791 A1 Oct. 8, 2009

Related U.S. Application Data

(60) Provisional application No. 61/016,897, filed on Dec. 27, 2007.

(51) Int. Cl.
  G02B 9/14 (2006.01)
  G02B 13/18 (2006.01)
(52) U.S. Cl. .................. 359/786; 359/716; 359/787; 359/788
(58) Field of Classification Search ................ 359/663, 359/716, 784, 786–788
See application file for complete search history.

(56) References Cited

U.S. PATENT DOCUMENTS

| | | | |
|---|---|---|---|
| 5,699,196 A | 12/1997 | Misawa | |
| 5,831,775 A | 11/1998 | Matsui | |
| 6,124,990 A | 9/2000 | Suzuki | |
| 6,498,690 B2 | 12/2002 | Ramm et al. | |
| RE39,424 E | 12/2006 | Moskovich | |
| 7,656,593 B2 * | 2/2010 | Do | 359/784 |

OTHER PUBLICATIONS

Gregory Hallock Smith, Camera Lenses From Box Camera to Digital, 2006, pp. title page, copyright page, 134-136, 188-190, SPIE Press, Bellingham, Washington USA.
Warren J. Smith, Modern Lens Design, A Resource Manual, 1992, title page, copyright page, 221-236, McGraw-Hill, Inc., New York, NY USA.

* cited by examiner

*Primary Examiner*—William C Choi
(74) *Attorney, Agent, or Firm*—O'Connell Law Firm

(57) ABSTRACT

A lens system with a first group having a positive meniscus lens and a sensor. The optical distance between the front surface of the first group and the sensor can be not greater than the height of the sensor times the image F-number, which may alternatively be referred to as the working F-number. A second group can be disposed adjacent to the front focal point of the first group, and a lens-stop can be disposed adjacent to the second group. A third group can be disposed midway between the lens-stop and the object field of the first and second groups. The image F-number can be 2.8 or greater. The first group can have a doublet formed by a first lens that is plano convex and a second lens that is plano concave. The second group can have a first, plano convex lens and a second, biconvex lens forming a doublet with a third, plano concave lens.

27 Claims, 9 Drawing Sheets

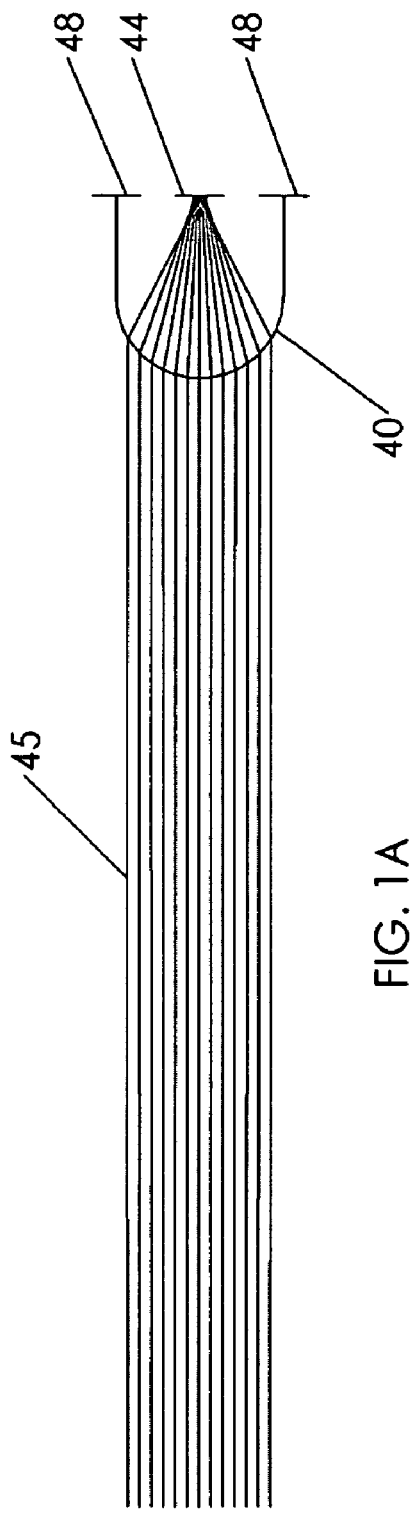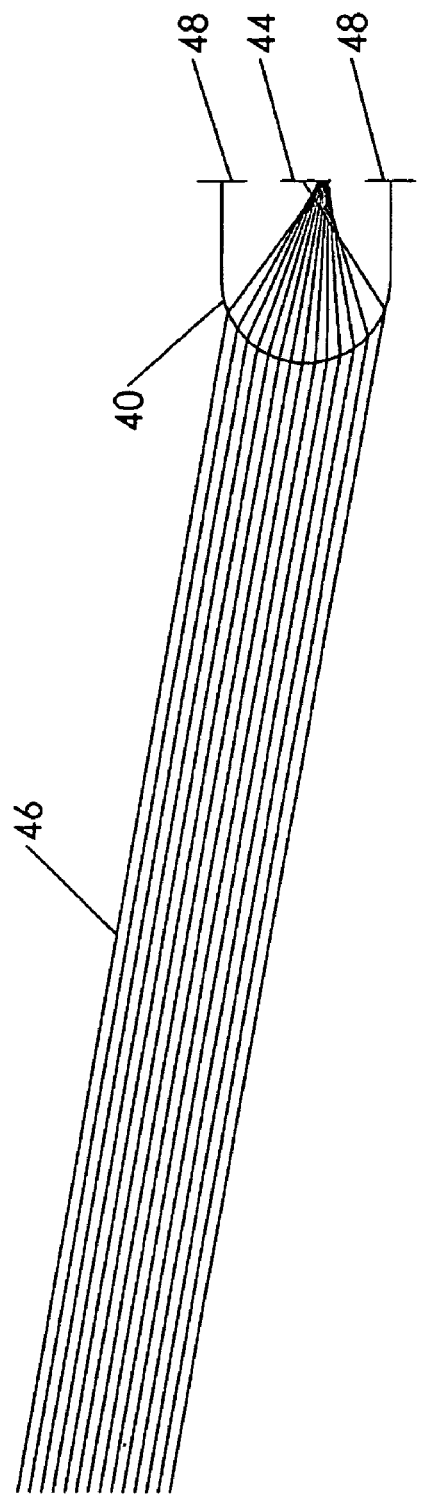
FIG. 1A
FIG. 1B

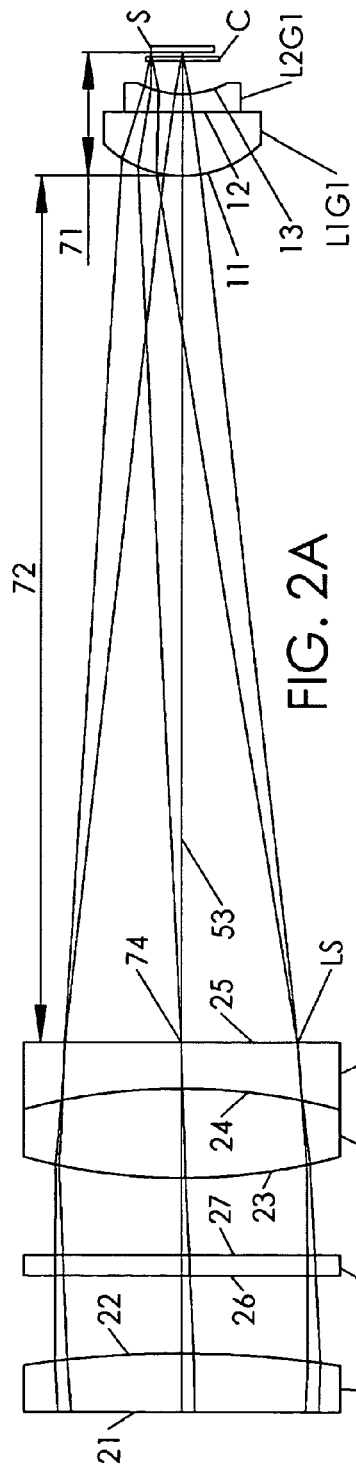
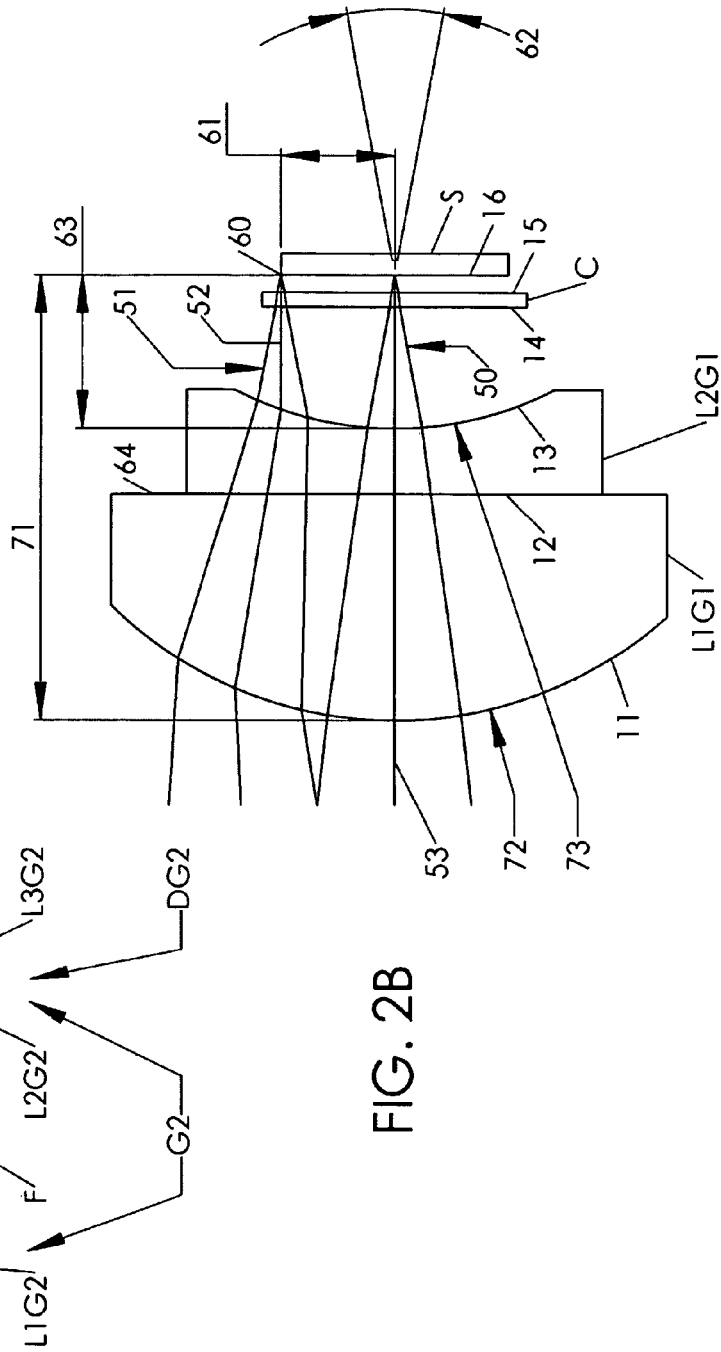
FIG. 2A
FIG. 2B

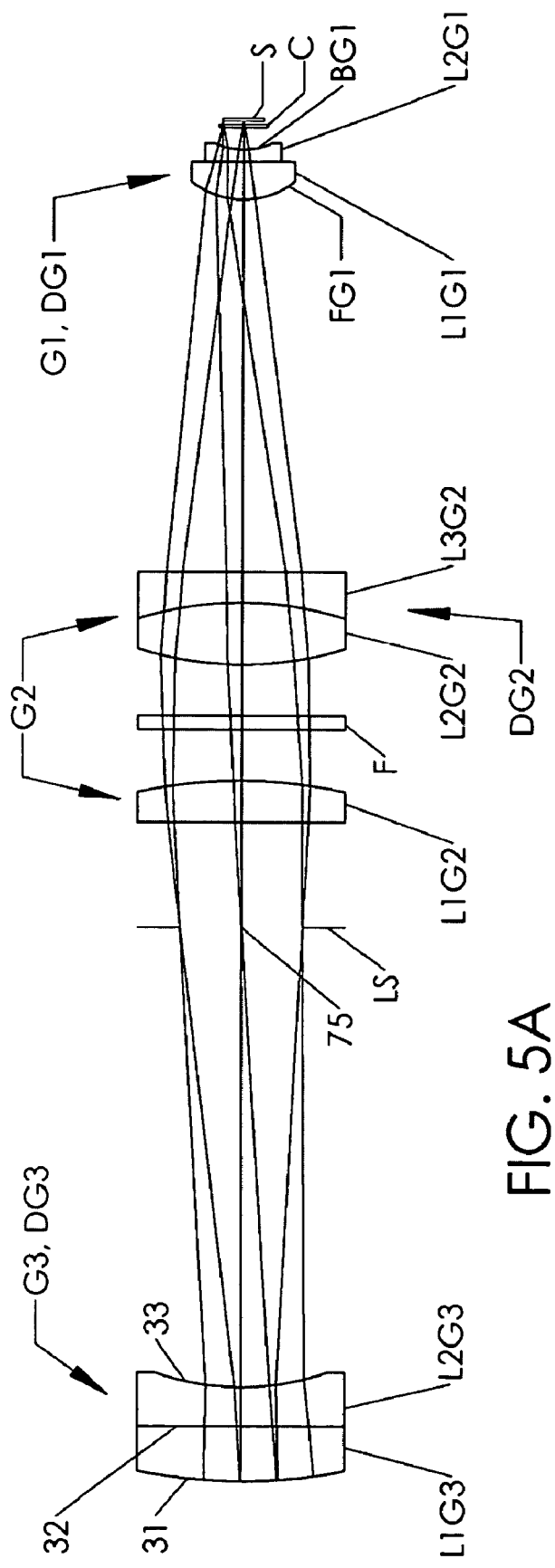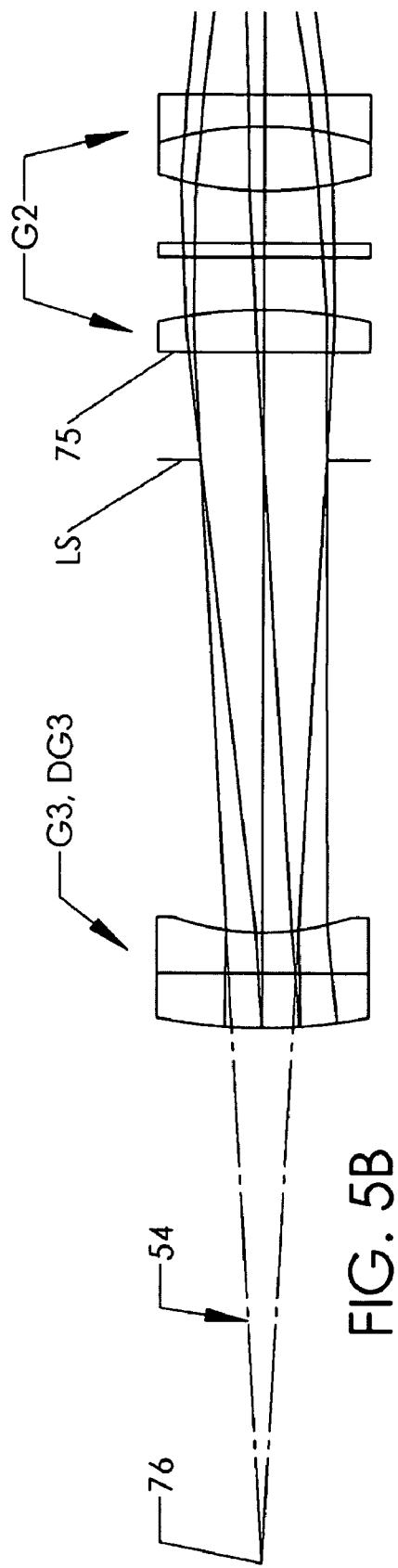
FIG. 5A
FIG. 5B

SPECTROSCOPY LENS FOR TELECENTRIC SENSOR

FIELD OF THE INVENTION

The present invention relates generally to lenses. More particularly, disclosed and protected herein is a lens construction that transforms rays from an object into telecentric rays at an image with an image F-number of 2.8 at magnification of −0.5 without vignetting thereby facilitating, among other things, the detection of low-light emissions from flourophores in biological applications.

BACKGROUND OF THE INVENTION

Biological flourophores are frequently excited with lasers of wavelengths at 488, 514 and 532 nm. The emission wavelength range of biological flourophores may be estimated as 488 to 588 nm.

The cost of chemicals consumed in a biological assay can be significant. Ergo, there is a demand for assays that employ smaller volumes of liquid. However, such smaller volumes can lead to emission signals in the range of 100-1000 photons.

Shot noise describes the statistical error due to a fixed quantum as the square-root of the expected quanta. Unwanted quanta from other image point-spreads might contribute additional shot noise to the signal. A high-contrast optical point-spread is required for the detection of small signals from flourophores. Accordingly, the reduction of shot noise from other object points is essential.

The maximum collection of light dictates a large etendue or space-angle product at the sensor. The dimension of a pixel is defined by the sensor, but typically the angular extent is defined by the lens. The image F-number of the lens should be minimized without contribution to background through increased point-spread. The image F-number IFN is also known as the working F-number WFN. The image F-number represents the half angle of a image ray bundle $\theta_{IRB}$ at the image and can be determined by the following formula:

$$IFN = \frac{1}{2\sin\theta_{IRB}} = WFN.$$

Typically, the F-number of a lens refers an infinitely distant object.

$$FN = \frac{f}{D_{EnP}},$$

Wherein f is the focal length for an infinitely distant object, and $D_{EnP}$ is the diameter of the entrance pupil for an on-axis object. It is important to consider the implication of the F-number of a lens which is defined by an infinity distant object and a magnification of zero. At a magnification of 0.5, the image F-number is at least 1.5 times the F-number.

The image F-number may also increase with field position as indicated by a decreasing relative illumination. In a perfect lens of zero magnification, the relative illumination obeys $$\cos^3\theta_F = \cos^3\left(\frac{h_F}{f}\right)$$

Wherein $\theta_F$ is the field angle and $h_F$ is the field height.

Typically, a short focal lens with F2.8 displays a rapid drop in relative illumination with field position. A double Gauss lens requires signification drop of relative illumination. Both of these effects contribute to an image F-number which is much greater than the F-number of the lens. Careful consideration of the image F-number is warranted when photons are scarce. The image F-number of the current invention is a true 2.8 which efficiently matches the telecentric CCD sensors sold under the registered trademark KODAK by the Eastman Kodak Company of Rochester, N.Y.

The object F-number OFN, determines the hemispheircal collection efficiency of point-source or sub-pixel object as $$HCE = \frac{1}{8}\frac{1}{OFN^2} = \frac{1}{8}\frac{M^2}{IFN^2}.$$

The optical length or optical distance is defined as $$\Delta = \sum_i \frac{d_i}{n_i},$$

Wherein $d_i$ is the spatial length of the i-th material, and $n_i$ is refractive index of the i-th material. The optical length represents the equivalent length in air. It should not be confused the optical path length which is related to the number of wavelengths along a path.

The optical power of a surface is defined as $$\Phi = \frac{n_2}{(n_2 - n_1)R},$$

Wherein $n_1$ is refractive index of the first material, $n_2$ is refractive index of the second material, and R is the radius of curvature of the interface of the materials. A radius with origin on the exiting side of the interface is positive, while a radius with origin on the incident side of the interface is negative. The optical power of a doublet is fairly estimated by the sum the optical powers of the three surfaces of the doublet, while the focal length equals the reciprocal of the total power. Ergo the focal length of a doublet is fairly estimated as the reciprocal of the sum of the powers of each surface. An exact expression for summation of the two optical powers $\Phi_{12}$ is $$\Phi_{12} = \phi_2 + \phi_2 - \phi_1\phi_2\Delta_{12}.$$

Wherein $\phi_1$ and $\phi_2$ are the powers of the first and surfaces with an optical length $\Delta_{12}$ between them. As it becomes important later, the power of a meniscus lens is determined by the summation two powers that are similar in magnitude but opposite in sign. Consequently, the power of a meniscus lens decreases as the optical length between the surfaces decreases. The margin of a meniscus lens can have less power the center of a meniscus.

A telecentric orientation of the image rays is highly desirable for sensors with microlens elements for increased quantum efficiency. As the image F-number decreases, telecentric rays at the image become difficult to maintain without aberration. A lower limit of the acceptance F-number for a charge-coupled device (CCD) with a microlens is typically 2.8.

The angular extent of an interline sensor with microlens is displayed in FIGS. 1A and 1B where FIG. 1A displays on-axis rays 45 and FIG. 1B displays the off-axis rays 46. FIGS. 1A and 1B are based upon an interline transfer CCD with microlens (KAI-1020) sold under the registered trademark KODAK by the Eastman Kodak Company of Rochester, N.Y., which employs a transparent dome with square base over each pixel. The transparent dome has a roughly cylindrical profile over a row of active wells 44. Ergo, the transparent dome acts as a microlens 40, which creates an image of a telecentric lens-stop upon an active well 44 at the focal point of the microlens 40. A pixel or picture element comprises an entire active well 44 and two halves of a dark well 48.

FIG. 1A displays a microlens 40 which directs on-axis rays 45 into an active well 44. FIG. 1B displays a microlens 40 which directs off-axis rays 46 into an active well 44. The off-axis rays 46 correspond to the angular limits of an F2.8 image and the sensor. The dark wells 48 provide interline transfer of charge during collection of charge by the active wells 44. The active well 44 does not occupy half of the microlens cell due to shielding by electrical contacts. The microlens 40 effectively directs both on-axis rays 45 and off-axis rays 46 into the active pixel. The microlens 40 can increase the quantum efficiency of a pixel from 9% to 45%. This defines a gain of 5 times in quantum efficiency due to application of a microlens 40 to a telecentric F2.8 image.

Each pixel within the sensor array contains the same distant F2.8 lens-stop. Consequently, the lens-stop of the sensor array is infinitely distant. This condition is known as telecentric which implies "distant center." The distant lens-stop also defines a distant entrance pupil for the microlens array. Efficient coupling of light by a camera lens into the telecentric sensor requires a distant exit pupil for camera lens that matches the distant entrance pupil of the microlens 40. Placement of the lens-stop within the camera determines the location of the exit pupil of the camera. A telecentric lens is difficult to create at low F-numbers.

Most camera lenses do not provide a distant exit pupil because they are not telecentric at the image. Ergo, the coupling efficiency by camera lens into a CCD with a microlens 40 is not consistent throughout the field. As the field position increases, the F-number decreases due to vignetting by the distant entrance pupil of the microlens 40.

The ability to continue integration during transfer is beneficial to lengthy biological processes that demand faster processes for application to genome sequencing. Shortening the time to process completion is essential to bringing human-genome sequencing to clinical applications.

Contents of N by N pixels may be collected in a larger "bin" through sequencing of electronic gates within a CCD. Binning of N-squared pixels may be employed to achieve an N:1 magnification of the pixel dimension. Binning increases the signal by N-squared while increasing the shot noise by N and maintaining the read noise. Ergo, the signal-to-noise ratio can be increased by N-times until the full-well capacity of the CCD is reached.

If the object becomes a subpixel object or point-source, then only one-quarter of the total signal may be reliably collected by a single pixel. The one-quarter minimum occurs when the image of spot is centered on the shared vertex of four pixels. Ergo, the minimum dimension of the pixel or super-pixel should be half the dimension of the point-source image at the sensor. In one example, a sensor KAI-1020 employs a 7.4 μm by 7.4 μm square pixel with microlens. A 7.5 μm pixel can be chosen for the design, which yields 15 μm as the first super pixel.

The ultimate goal of fluorescent imaging is the collection of enough light from the object to establish high contrast with background and/or noise. Ideally, a low F-number lens should not create large tails because those tails contribute to the background. The spatial extent of the image rays must be localized within the spatial extent of the pixel for minimization of background, while the angular extent of the image rays must be maximized within the angular extent of the pixel for maximum signal strength. The shot noise of the background and the shot noise of the signal cannot be removed from the signal. However, the shot noise of the background can be prevented through careful optical design. A lens with a sharp point spread minimizes background and the associated shot noise.

A consistent spot-size and F-number is paramount in spectroscopy, while the number of pixels, variable focus, zoom, and broad wavelength are not. The full wavelength spectrum of human vision is certainly not required in fluorescent applications, yet many instruments employ camera lenses that were designed for human vision. Furthermore, placement of a plano spectroscopy filter in a low F-number lens creates optical aberrations that reduce contrast and spread edges.

In U.S. Pat. No. 5,831,775, Matsui provides an example of the limitations of an ordinary camera lens. In Matsui '775, Table 3 provides the prescription for a lens with an effective focal length of 105 mm and an F-number of 2.9 at linear magnifications of −0.1, −0.5, and −1.0. The stop is located at surface 7 without further instruction by Matsui '775. Table 3 of Matsui '775 provides data for radius of curvature, thickness, refractive index, and Abbe number for 17 surfaces.

The specifications of a KAI-1020 sensor indicate a relative quantum efficiency of 70% of maximum at 10° from normal incidence 0°. Therefore the angle of acceptance AA of the CCD is defined as 10° for the current discussion. The angle of acceptance of 10° specifies an acceptance F-number of 2.8.

As the lens of Matsui '775 translates from magnifications of −0.1 to −1.0, the lens-stop translates farther from the sensor. Consequently, the image F-number IFN increases steadily. This inflation of IFN with increasing absolute magnification is an undersirable effect in spectroscopy. At magnification of −0.5, the object and image distances are 3f and 1.5f respectively while the IFN becomes 1.5 times the FN. The IFN might increase further if the lens-stop shifts within the lens to improve image quality. As a consequence of F-number inflation, this improved image requires further reduction of collection. With this, the F2.9 lens of Matsui '775 displays an IFN of 4.4 at magnification of −0.5 an IFN of 5.8 at magnification of 1.0. Vignetting may also increase the F-number.

The Matsui '775 lens employs 9 elements with 16 air-to-glass interfaces. The addition of a filter and a cover glass for CCD brings the total to 11 elements with 20 air-to-glass interfaces. Assuming a transmittance of 99% per surface over 21 surfaces, this yields a total transmittance of 82%. Consideration of scatter due to surface imperfections further decreases the transmittance. A lens system with 10 air-to-glass interfaces of 99% transmittance would display a transmittance of 90% with less scatter. The large number of surfaces in Matsui '775 permits a large range of magnification which is not required in fluorescent spectroscopy.

Vignetting results from a clipping of rays from off-axis objects for management of aberrations throughout the entire image. The word vignette implies use of vines to soften edges within architecture. Such softening of edges can hide astigmatism and coma within the margin of the field. Vignetting is not desirable in spectroscopy where collection efficiency and point-spread must be maintained throughout the field. Vignetting might be pleasing to the eye in photography, but the associated reduction in photon count is detrimental to low-light spectroscopy. Vignetting must be eliminated or at least minimized, as the performance of the instrument is limited to the point of weakest irradiance and/or contrast within the image. Many lenses employ vignetting for maintenance of point-spread. There is also another source of vignetting besides clipping. The solid angle of the lens-stop with respect to the object point displays a cosine-cubed dependency upon field angle. This particular type of vignetting can be minimized through minimization of field angle. Consequently, a wide angular field is detrimental in spectroscopy. However, a narrow angular field requires a longer lens, which is not beneficial to photography by humans, but is acceptable for machine vision.

Back-illuminated CCDs, such as the iXon DU-898 BI by Andor Technology of Belfast, Northern Ireland, can display a quantum efficiency of 90% without a microlens array. However, back-illuminated CCDs are extremely difficult to manufacture, and, consequently, are much more expensive than front-illuminated CCDs with microlens arrays. Furthermore, back-illuminated CCDs are not immune to the intrinsic vignetting of an ordinary camera lens. Consequently, an F2.8 lens without vignetting is still advantageous for back-illuminated CCDs.

In light of the foregoing, it will be appreciated that there exists a plurality of deficiencies in the current lens technology for the efficient collection of fluorescent signals from biological assays. The application of single molecule detection demands higher collection efficiency, less background noise, and less vignetting. A lens with a telecentric image for application to CCDs with microlens elements is highly advantageous.

There are two lens types in the prior art with similar structure to the current invention: a Petzval lens, and a tube lens. The Petzval Lens was conceived in 1840 with numerous variations to follow. The tube lens is a development late 1900s for infinity-corrected objective lenses with microscope structures. More description of these lenses in relation to the current is presented as follows.

A Petzval lens comprises a first and second doublet wherein the second doublet is midway between the first doublet and the sensor. The Petzval lens displays significant Petzval curvature which describes the defocus of the image across the sensor. A negative field flatter may be placed near the sensor to correct for this curvature. The rays of the margin substantially overlap the rays of center in the first group. The rays of the margin are substantially separated from the rays of center in second group. The concept is similar to the goal of the current invention without application of the specific features of the invention, wherein a positive meniscus of the second group achieves field-flattening though increased optical distance at the margin of the second group.

A tube lens by Nikon displays similar shape to the current invention in U.S. Pat. No. 5,699,196 to Misiwa. It comprises a positive doublet as the first group and a negative meniscus as the second lens as defined in FIG. 3 and Table 1 of Misiwa U.S. Pat. No. 5,699,196. Application of the prescription tube lens in Table 1 reveals that the second group is negative meniscus. Given a 10 mm entrance pupil and 200 mm effective focal length, the operating F-number is 20 for the tube lens. The rays of the margin are substantially separated from the rays of center in both groups.

The concepts of the Petzval lens and the Misiwa tube lens are similar to the goal of the current invention, but very different from the specific features of the invention. The Petzval lens and the Misiwa tube lens both separate rays of margins from rays of center within the second group. However, neither the Petzval lens nor the Misiwa tube lens employ a positive meniscus lens for field-flattening though increased optical distance at the margin of the second group. They both employ a negative element as a field flattener.

SUMMARY OF THE INVENTION

With an appreciation for the state of the art summarized above, the present is founded on the basic object of providing a lens arrangement for collecting fluorescent signals from biological assays that overcomes the disadvantages of the prior art.

A related object of the invention is to provide a lens arrangement that exhibits a high collection efficiency.

Another object of embodiments of the invention is to provide a lens arrangement that is demonstrates low background and noise while minimizing vignetting.

These and in all likelihood further objects and advantages of the present invention will become obvious not only to one who reviews the present specification and drawings but also to those who have an opportunity to make use of an embodiment of the spectroscopy lens disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

A first group G1 is placed in proximity to the sensor S. The sensor displays a margin 60 of the field at a height 61 of the sensor S. The rays 50 of the center of the field and the rays 51 of the margin 60 of the field are both telecentric at the sensor S. The chief ray 52 angle at the sensor S must be parallel to the optic axis 53 to achieve a telecentric image orientation. The first group G1 effectively manages the astigmatism, field curvature, and chief ray 52 angle at the sensor S through separation of rays by field and a positive meniscus shape.

The separation of rays by field enables the first group to act powerfully upon the rays 51 of the margin of the field while acting weakly upon the rays 50 of the center of the field. The positive meniscus shape provides three degrees of freedom, the radius 72 of the front surface 11, the radius 73 of the back surface 13, and optical distance 64 between them. The spherical aberration and coma of the first group G1 is minimized through two constraints: the radius 72 of the front surface 11 should equal the optical distance 71 from the front surface 11 to the sensor, and the radius 73 of the back surface 13 should equal at least twice the optical distance 72 from the back surface 13 to the sensor S.

A second group G2 effectively manages spherical aberration and coma through overlap of rays by field. The overlap of rays by field with the second group G2 is achieved though placement of the second group G2 near the front focal point 74 of the first group G1. The filter F may be placed within the second group G2. The spectral shift of the filter F is limited to 1% or less when the front focal point 74 of the first group G1 is at least 14 times the height 61 of the sensor.

A telecentric image orientation at the sensor S defines the placement of the lens-stop LS. If placed on the backside 25 of the second group G2, then the lens-stop is placed at the front focal point 74 of the first group G1. If placed on the front side 21 of the second group G2, then the lens-stop is placed at the front focal point 75 of the first and second groups G1 and G2.

The combination of the first and second groups works well for magnifications from −0.5 to −0.1. At −0.1, the total track length is nearly 1500 mm. A third group G3 may be added to maintain a total track length within 1000 mm. For most effective control of aberrations, the third group G3 is placed midway between the lens-stop and the object field point 76 of the first and second groups G1 and G2.

Plural embodiments of the present invention are described herein. Each embodiment transforms rays from an object into telecentric rays at an image with a working F-number of 2.8 without vignetting. The first embodiment employs first and second groups G1 G2 with a magnification of −0.5. The second embodiment employs first and second groups G1 G2 with a magnification of −0.1. A third embodiment employs first, second, and third groups G1 G2 G3 with a magnification of −0.1. As metrics of these embodiments, Seidel aberrations and ray intercept plots describe excellent confinement within a single pixel throughout the field of a KAI-1020 sensor. The data is modeled for 488, 514, and 588 nm. The wavelength range of 100 nm can be easily shifted towards longer wavelengths.

One will appreciate that the foregoing discussion broadly outlines the more important features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

FIG. 1A shows a ray trace of collection of on-axis rays by a single pixel with microlens;

FIG. 1B shows a ray trace of collection of off-axis rays by a single pixel with microlens;

FIG. 2A shows a ray trace of the first embodiment of the lens with paraxial magnification of −0.1;

FIG. 2B shows a ray trace of the first group of the lens of FIG. 2A;

FIG. 5A shows a ray trace of a third embodiment with three groups at a magnification of −0.1;

FIG. 5B shows a ray trace of the second and third groups of the lens of FIG. 5A.

DETAILED DESCRIPTION OF PREFERRED EMBODIMENTS

Figure 3A:
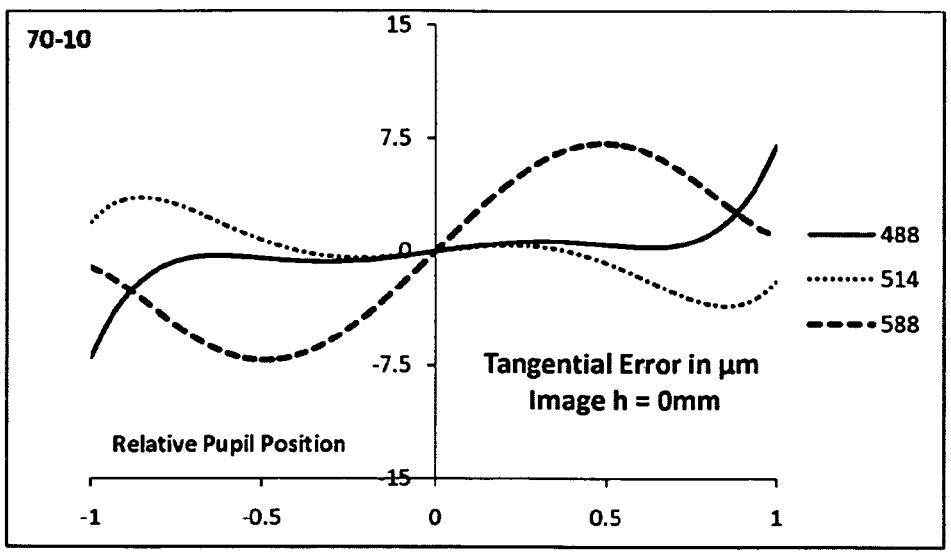
FIGS. 3A through 3F display the ray-intercept plots of the first embodiment of the lens with paraxial magnification of −0.5.
Figure 3B:
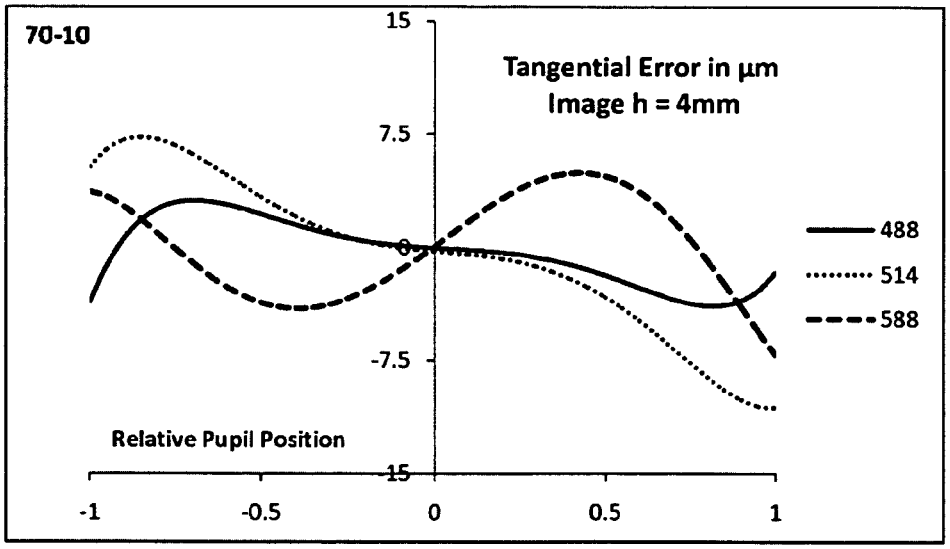

It will be appreciated that the lens construction disclosed herein is subject to widely varied embodiments. However, to ensure that one skilled in the art will be able to understand and, in appropriate cases, practice the present invention, certain preferred embodiments of the broader invention revealed herein are described below and shown in the accompanying drawing figures. Before any particular embodiment of the invention is explained in detail, it must be made clear that the following details of construction, descriptions of geometry, and illustrations of inventive concepts are mere examples of the many possible manifestations of the invention.

A first embodiment with paraxial magnification PMAG of −0.5 is displayed in FIGS. 2A and 2B. The lens system contains surfaces as indicated in the drawings. A first lens of the first group L1G1 is plano convex. The second lens of first group L2G1 is plano concave. A doublet of the first group DG1 is formed by fixation at plano surfaces 12 of L1G1 and L2G1. A first lens of the second group L1G2 is plano convex. A second lens of the second group L2G2 is biconvex. A third lens of the second group L3G2 is plano concave. A doublet of the second group DG2 is formed by fixation at the spherical surfaces 24 of L2G2 and L3G2.

Table 1A specifies a prescription for the first embodiment wherein Surf, Element, R, d, Glass, and D; indicate surface, radius of curvature, thickness; material; and diameter. Table 1B specifies the Seidel aberrations for the first embodiment wherein: SPHA, COMA, ASTI, FCUR, DIST, CA, and CT; indicate spherical aberration, coma, astigmatism, field curvature, distortion, axial color, and transverse color. The Seidel aberrations were derived from the optical design software sold under the registered trademark ZEMAX-EE by the ZEMAX Development Corporation of Bellevue, Wash., USA. The chief ray angle CRA, Petzval Radius PR, and wavelength WL are cited in the table 1B as 0°, −1005 mm, and 488 nm. The ray-intercept plots for image points at 0, 4, and 6 mm are displayed in FIGS. 3A through 3F. A ray-intercept describes destination error versus position within the lens stop. The wavelengths of FIG. 3 are 488, 514, and 588 nm, which offer 100 nm of spectral range for biological applications. As indicated by FIG. 3, most rays are contained within 7.5 μm and all rays are within 15 μm.

TABLE 1A

| (A) | | | | | | | |
|---|---|---|---|---|---|---|---|
| OSNA | EFL | PMAG | WFN | ISNA | TOTR | Length | |
| 0.089 | 138 | −0.50 | 2.8 | 0.176 | 262 | 527 | |

| Surf | Element | R | d | Glass | D | n @ 488 | n @ 514 | n @ 588 | V' |
|---|---|---|---|---|---|---|---|---|---|
| OBJ | | Infinity | 265.000 | | 24.6 | | | | |
| 21 | L1G2 | Infinity | 11.315 | S-LAL61 | 60.0 | 1.75057 | 1.74752 | 1.74097 | 182.1 |
| 22 | | −195.54 | 15.000 | | 60.0 | | | | |
| 26 | F | Infinity | 4.000 | SILICA | 60.0 | 1.46301 | 1.46158 | 1.45845 | 320.1 |
| 27 | | Infinity | 15.000 | | 60.0 | | | | |
| 23 | L2G2 | 113.28 | 17.089 | S-BSM36 | 60.0 | 1.64996 | 1.64759 | 1.64247 | 220.0 |
| 24 | L3G1 | −113.28 | 9.000 | S-TIH11 | 60.0 | 1.80596 | 1.79896 | 1.78466 | 84.4 |
| 25, 74 | LS | Infinity | 167.186 | | 44.4 | | | | |
| 11 | L1G1 | 21.30 | 12.179 | S-LAH63 | 30.0 | 1.81834 | 1.81384 | 1.80435 | 129.7 |
| 12 | L2G2 | Infinity | 3.500 | S-TIH53 | 22.0 | 1.87144 | 1.86325 | 1.84658 | 75.0 |
| 13 | | 18.37 | 6.500 | | 17.0 | | | | |

TABLE 1A-continued (A)

| 14 | C | Infinity | 0.760 | D-263 | 14.0 | 1.52978 | 1.52747 | 1.52308 | 228.0 |
| 15 | | Infinity | 0.940 | | 14.0 | | | | |
| 16 | Sensor | Infinity | 0.000 | | 12.0 | | | | | unit of distance is mm
70-10.ZMX

TABLE 1B (B)

| OSNA | MFA1 | EFL | PMAG | WFN | ISNA | CRA | PR | WL |
|---|---|---|---|---|---|---|---|---|
| 0.089 | 2.9° | 138 | −0.5 | 2.8 | 0.176 | 0.0° | −1005 | 0.488 |
| Surf | Element | SPHA | COMA | ASTI | FCUR | DIST | CA | CT |
| 21 | L1G2 | 11 | 5 | 2 | 0 | 1 | −11 | −5 |
| 22 | | 13 | −6 | 2 | 3 | −2 | −17 | 7 |
| 23,74 | F | 0 | 0 | 0 | 0 | 1 | 0 | −3 |
| 27 | | 0 | 0 | 0 | 0 | −1 | 0 | 3 |
| 23 | L2G2 | 50 | 9 | 2 | 4 | 1 | −23 | −4 |
| 24 | L3G1 | −90 | 10 | −1 | −1 | 0 | 77 | −9 |
| 25,74 | LS | 21 | −9 | 4 | 0 | −2 | −29 | 13 |
| 11 | L1G1 | 0 | −3 | −24 | 24 | 5 | −2 | −12 |
| 12 | L2G2 | 0 | −1 | −1 | 0 | −1 | 3 | 3 |
| 13 | | 2 | −5 | 17 | −29 | 39 | −2 | 6 |
| 14 | C | −1 | 0 | 0 | 0 | 0 | 0 | 0 |
| 15 | | 1 | 0 | 0 | 0 | 0 | 0 | 0 |
| 16 | Sensor | 0 | 0 | 0 | 0 | 0 | 0 | 0 |
| Total | | 0 | 5 | 0 | 2 | 1 | 41 | −4 | 0 | unit of distance is μm except in FCUR
Unit of FCUR is 1/mm
70-10.ZMX

A second embodiment with paraxial magnification of −0.1 is specified by prescription in Table 2A with aberrations listed in Table 2B. The chief ray angle CRA, Petzval Radius PR, and wavelength WL are cited in Table 2B as 0.0°, −1176 mm, 488 nm. The ray-intercept plots for image points at 0, 4, and 6 mm are displayed in FIGS. 4A through 4F.

TABLE 2A (A)

| | OSNA | EFL | PMAG | WFN | ISNA | TOTR | Length | |
|---|---|---|---|---|---|---|---|---|
| | 0.018 | 126 | −0.10 | 2.8 | 0.176 | 256 | 1516 | |
| Surf | Element | R | d | Glass | D | n @ 488 | n @ 514 | n @ 588 | V' |
| OBJ | | Infinity | 1260.628 | | 119.8 | | | | |
| 75 | LS | Infinity | 22.230 | | 45.6 | | | | |
| 21 | L1G2 | Infinity | 9.779 | S-BAM12 | 60.0 | 1.64906 | 1.64591 | 1.63927 | 168.2 |
| 22 | | −578.31 | 15.000 | | 60.0 | | | | |
| 26 | F | Infinity | 4.000 | SILICA | 60.0 | 1.46301 | 1.46158 | 1.45845 | 320.1 |
| 27 | | Infinity | 15.000 | | 60.0 | | | | |
| 23 | L2G2 | 107.98 | 17.502 | S-BSM71 | 60.0 | 1.65684 | 1.65417 | 1.64847 | 197.7 |
| 24 | L3G2 | −107.98 | 9.000 | S-TIH4 | 60.0 | 1.77425 | 1.76798 | 1.75514 | 92.5 |
| 25 | | Infinity | 140.095 | | 60.0 | | | | |
| 11 | L1G1 | 24.25 | 11.195 | S-LAM54 | 30.0 | 1.76779 | 1.76434 | 1.75696 | 162.9 |
| 12 | L2G1 | Infinity | 3.500 | S-TIH10 | 22.0 | 1.74599 | 1.74016 | 1.72819 | 97.8 |
| 13 | | 20.31 | 6.500 | | 17.0 | | | | |
| 14 | C | Infinity | 0.760 | D-263 | 14.0 | 1.52978 | 1.52747 | 1.52308 | 228.0 |
| 15 | | Infinity | 0.940 | | 14.0 | | | | |
| 16 | S | Infinity | 0.000 | | 12.0 | | | | | unit of distance is mm
80-6.ZMX

TABLE 2B

| (B) | | | | | | | | |
|---|---|---|---|---|---|---|---|---|
| OSNA 0.018 | MFAl 3.3° | EFL 126 | PMAG -0.1 | WFN 2.8 | ISNA 0.176 | CRA 0.0° | PR -1176 | WL 0.488 |
| Surf | Element | SPHA | COMA | ASTI | FCUR | DIST | CA | CT |
| 75 | LS | 0 | 0 | 0 | 0 | 0 | 0 | 0 |
| 21 | L1G2 | 0 | 0 | 1 | 0 | 2 | -2 | -6 |
| 22 |  | 1 | -1 | 1 | 1 | -1 | -7 | 6 |
| 26 | F | 0 | 0 | 0 | 0 | 1 | 1 | -3 |
| 27 |  | 0 | 0 | 0 | 0 | -1 | -1 | 3 |
| 23 | L2G2 | 45 | 16 | 5 | 4 | 3 | -24 | -8 |
| 24 | L3G2 | -70 | -3 | 0 | 0 | 0 | 59 | 2 |
| 25 |  | 28 | -7 | 2 | 0 | 0 | -28 | 7 |
| 11 | L1G1 | 0 | -1 | -21 | 21 | -11 | 0 | -7 |
| 12 | L2G2 | 0 | 0 | 0 | 0 | 0 | 2 | 2 |
| 13 |  | 2 | -5 | 13 | -24 | 31 | -2 | 4 |
| 14 | C | -1 | 0 | 0 | 0 | 0 | 0 | 0 |
| 15 |  | 1 | 0 | 0 | 0 | 0 | 0 | 0 |
| 16 | S | 0 | 0 | 0 | 0 | 0 | 0 | 0 |
| Total |  | 5 | 0 | 1 | 1 | 23 | -2 | -1 | unit of distance is μm except in PR
Unit of PR is mm
80-6.ZMX

A third embodiment with paraxial magnification of −0.1 is displayed in FIGS. 5A and 5B. The prescription is defined in Table 3A with aberrations listed in Table 3B. The chief ray angle CRA, Petzval Radius PR, and wavelength WL are cited in Table 3B as 0.0°, −5044 mm, 488 nm. The ray-intercept plots for image points at 0, 4, and 6 mm are displayed in FIGS. 6A through 6F. A first lens of the third group L1G3 is plano convex. A second lens of the third group L1G3 is plano concave. A doublet of the third group DG3 is formed by fixation at plano surfaces of L1G3 and L2G3.

TABLE 3A

| (A) | | | | | | | |
|---|---|---|---|---|---|---|---|
| OSNA | EFL | PMAG | WFN | ISNA | TOTR | Length | |
| 0.018 | 72 | −0.10 | 2.8 | 0.176 | 400 | 1000 | |

| Surf | Element | R | d | Glass | D | n @ 488 | n @ 514 | n @ 588 | V' |
|---|---|---|---|---|---|---|---|---|---|
| OBJ |  | Infinity | 600.000 |  | 121.7 |  |  |  |  |
| 31 | L1G3 | 151.57 | 16.001 | S-BAH32 | 60.0 | 1.68171 | 1.67791 | 1.66994 | 142.6 |
| 32 | L2G3 | Infinity | 11.661 | S-BSM9 | 60.0 | 1.62165 | 1.61922 | 1.61402 | 212.3 |
| 33 |  | 74.18 | 135.472 |  | 50.0 |  |  |  |  |
| 75 | LS | Infinity | 30.677 |  | 35.5 |  |  |  |  |
| 21 | L1G2 | Infinity | 12.330 | S-FSL5 | 60.0 | 1.49217 | 1.49069 | 1.48747 | 317.5 |
| 22 |  | −136.82 | 15.000 |  | 60.0 |  |  |  |  |
| 26 | F | Infinity | 4.000 | SILICA | 60.0 | 1.46301 | 1.46158 | 1.45845 | 320.1 |
| 27 |  | Infinity | 15.000 |  | 60.0 |  |  |  |  |
| 23 | L1G2 | 98.20 | 18.389 | S-LAL7 | 60.0 | 1.65915 | 1.65675 | 1.65157 | 218.7 |
| 24 | L2G2 | −98.20 | 9.000 | S-TIH4 | 60.0 | 1.77425 | 1.76798 | 1.75514 | 92.5 |
| 25 |  | Infinity | 109.488 |  | 60.0 |  |  |  |  |
| 11 | L1G1 | 23.93 | 11.282 | S-LAM60 | 30.0 | 1.75346 | 1.75018 | 1.74316 | 170.0 |
| 12 | L2G1 | Infinity | 3.500 | S-TIH18 | 22.0 | 1.73861 | 1.73300 | 1.72145 | 101.0 |
| 13 |  | 19.92 | 6.500 |  | 17.0 |  |  |  |  |
| 14 | C | Infinity | 0.760 | D-263 | 14.0 | 1.52978 | 1.52747 | 1.52308 | 228.0 |
| 15 |  | Infinity | 0.940 |  | 14.0 |  |  |  |  |
| 16 | S | Infinity | 0.000 |  | 12.0 |  |  |  |  | unit of distance is mm
82-10.ZMX

TABLE 3B

| (B) | | | | | | | | |
|---|---|---|---|---|---|---|---|---|
| OSNA 0.018 | MFA1 3.9° | EFL 72 | PMAG -0.1 | WFN 2.8 | ISNA 0.176 | CRA 0.0° | PR -5044 | WL 0.488 |
| Surf | Element | SPHA | COMA | ASTI | FCUR | DIST | CA | CT |
| 31 | L1G3 | 2 | 0 | 0 | 3 | 1 | -7 | -1 |
| 32 | L2G3 | 0 | 0 | 0 | 0 | -1 | -1 | 3 |
| 33 |  | -25 | 7 | -2 | -6 | 2 | 9 | -2 |
| 75 | LS | 0 | 0 | 0 | 0 | 0 | 0 | 0 |
| 21 | L1G2 | 2 | 2 | 2 | 0 | 2 | -3 | -4 |
| 22 |  | 21 | -5 | 1 | 3 | -1 | -10 | 2 |
| 26 | F | 0 | 0 | 0 | 0 | 1 | 1 | -3 |
| 27 |  | 0 | 0 | 0 | 0 | -1 | -1 | 3 |
| 23 | L1G2 | 23 | 12 | 6 | 5 | 6 | -16 | -8 |
| 24 | L2G2 | -46 | -5 | -1 | 0 | 0 | 49 | 5 |
| 25 |  | 23 | -5 | 1 | 0 | 0 | -23 | 5 |
| 11 | L1G1 | 0 | -1 | -21 | 21 | -11 | 0 | -7 |
| 12 | L2G2 | 0 | 0 | 0 | 0 | 0 | 2 | 2 |
| 13 |  | 2 | -5 | 13 | -24 | 31 | -2 | 4 |
| 14 | C | -1 | 0 | 0 | 0 | 0 | 0 | 0 |
| 15 |  | 1 | 0 | 0 | 0 | 0 | 0 | 0 |
| 16 | S | 0 | 0 | 0 | 0 | 0 | 0 | 0 |
| Total |  | 1 | 0 | 1 | 0 | 29 | -2 | 0 | unit of distance is μm except PR
Unit of PR is mm
82-10.ZMX

The first and second embodiments define a range of paraxial magnification from −0.5 to −0.1 wherein the ISNA 0.175 is maintained. At paraxial magnifications between −0.5 and −1.0, an ISNA of 0.176 cannot be maintained without creation of significant aberrations. The refractive index of glass changes much faster with wavelength at shorter wavelengths. Consequently, the spectral range cannot be easily extended to shorter wavelengths than 488 nm, while the spectral range can be easily extended to longer wavelengths than 588 nm. The first, second, and third embodiments are highly adapted to fluorescent detection within biological specimens. Other applications are certainly possible and within the scope of the invention.

Several basic parameters of the first embodiment are cited in Table 1A where the default unit of distance is mm. The object space numerical aperture OSNA is 0.088. The effective focal length EFL is 138. The paraxial magnification PMAG is −0.50, which describes the magnification without distortion. The working F-number WFN is 2.8 at the image. The image space numerical aperture ISNA is 0.176. The total track length TOTR is 262. The object distance is 265 as indicated thickness of surface OBJ. The distance from object to image is approximately 527. The image height of 6.0 is indicated by the diameter of the sensor as 12.0. The object height of 12.3 is indicated by the diameter of surface 0 as 24.6. The actual magnification is not −0.5 due to a distortion of approximately 1.9%.

Several basic parameters of the second embodiment are cited in Table 2A where the default unit of distance is again mm. The object space numerical aperture OSNA is 0.018. The effective focal length EFL is 126. The paraxial magnification MAG is −0.10, which describes the magnification without distortion. The working F-number WFN is 2.8 at the image. The image space numerical aperture ISNA is 0.176. The total track length TOTR is 256. The object distance is 1261 as indicated thickness of surface OBJ. The distance from object to image is approximately 1516. The image height of 6.0 is indicated by the diameter of the sensor as 12.0. The object height of 59.9 is indicated by the diameter of surface OBJ. The actual magnification is not −0.1 due to a circa 0.2% distortion.

Figure 3C:
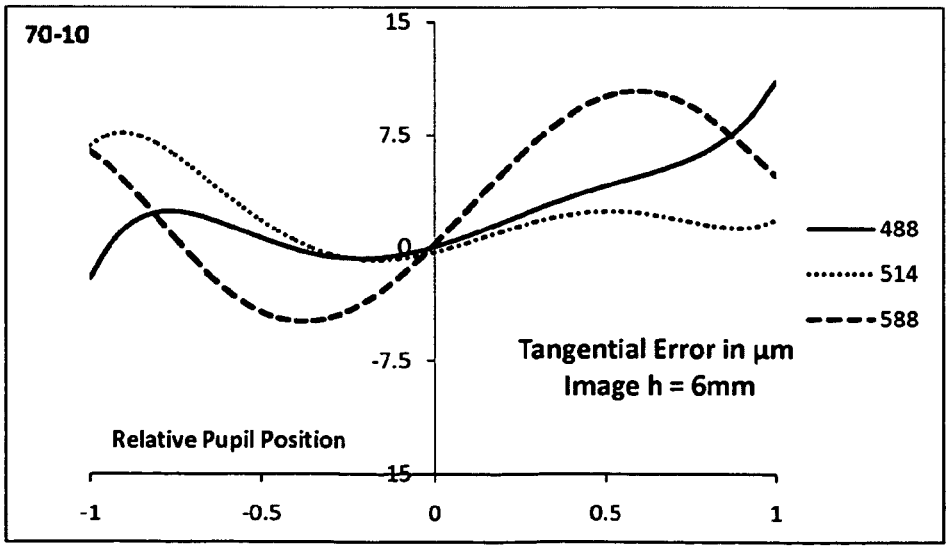
Figure 3D:
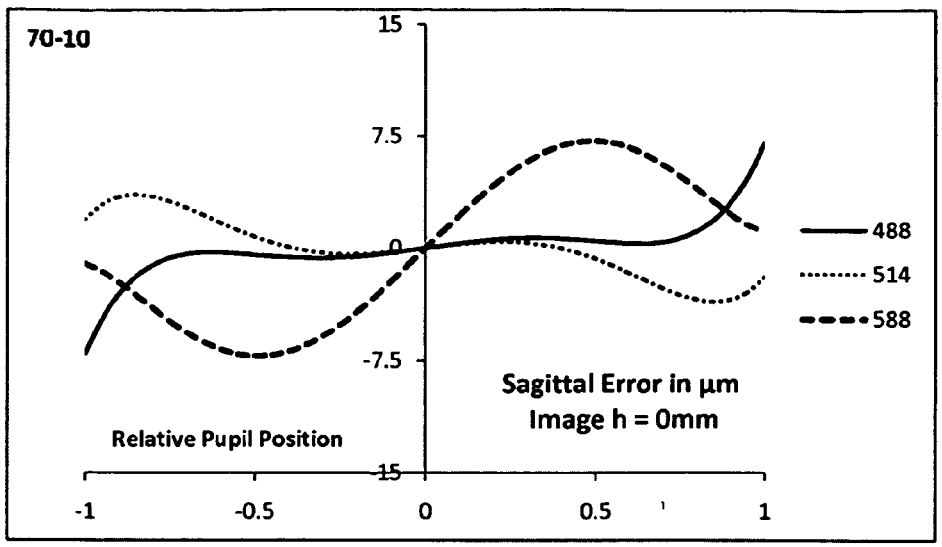
Figure 3E:
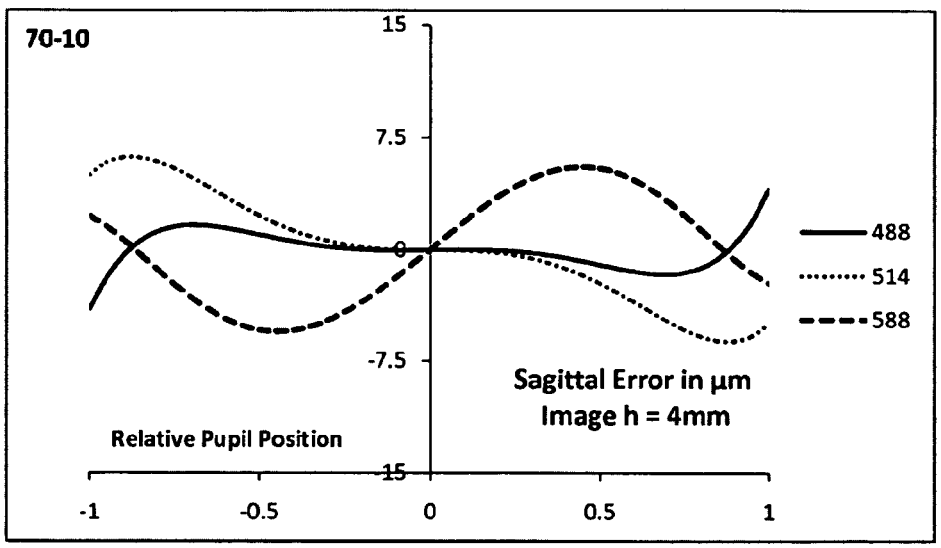
Figure 3F:
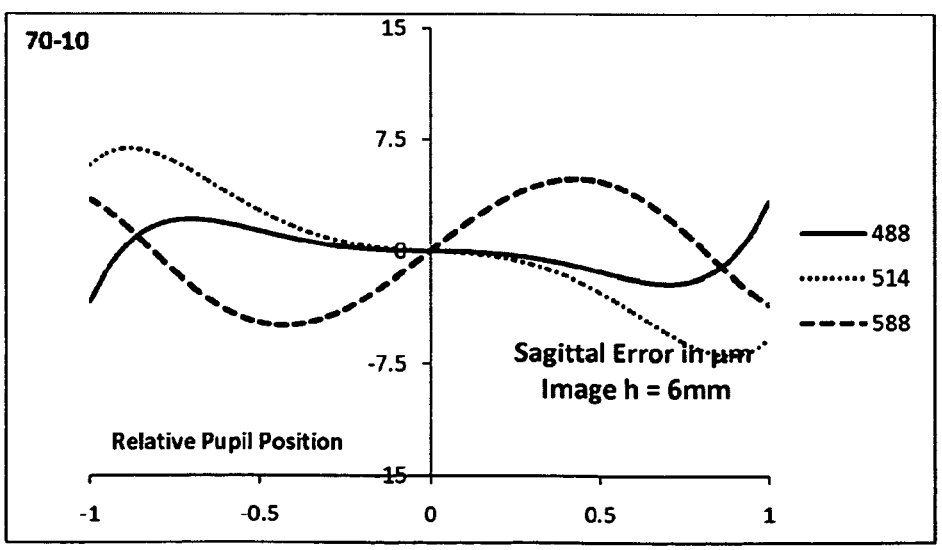
Figure 4A:
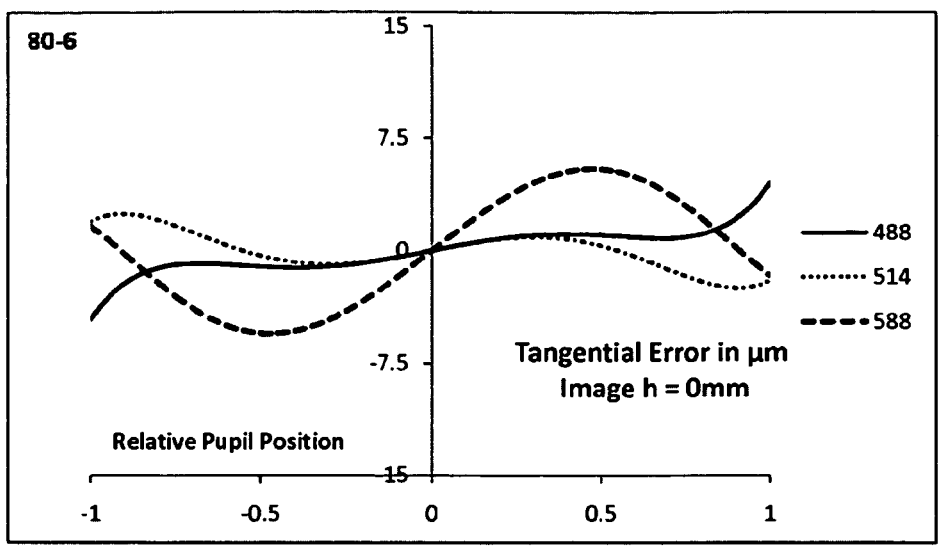
FIGS. 4A through 4F display the ray-intercept plots of a second embodiment of the lens disclosed herein with paraxial magnification of −0.1.
Figure 4B:
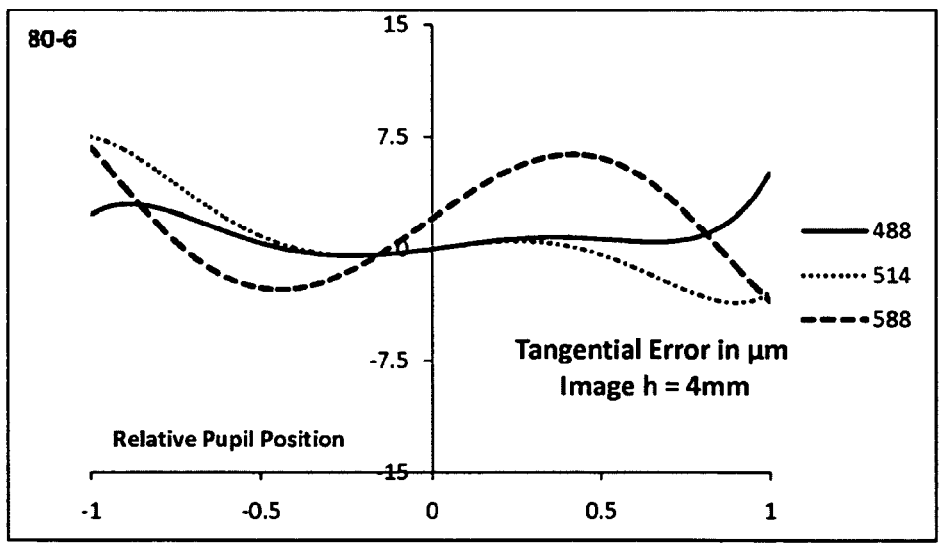
Figure 4C:
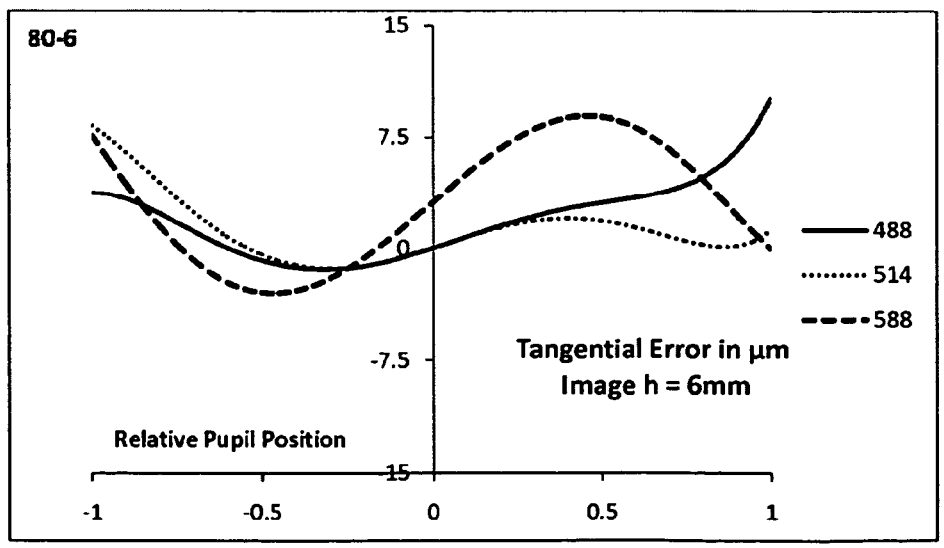
Figure 4D:
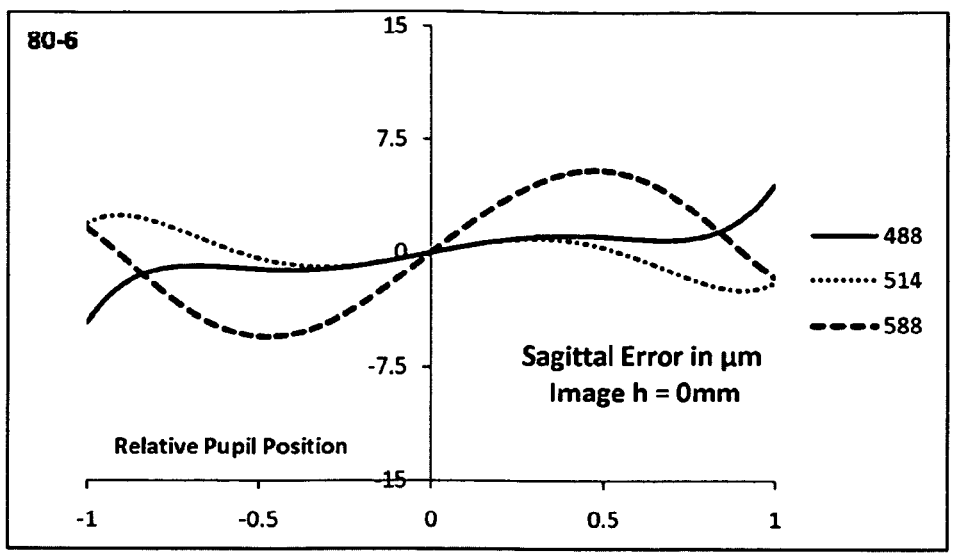
Figure 4E:
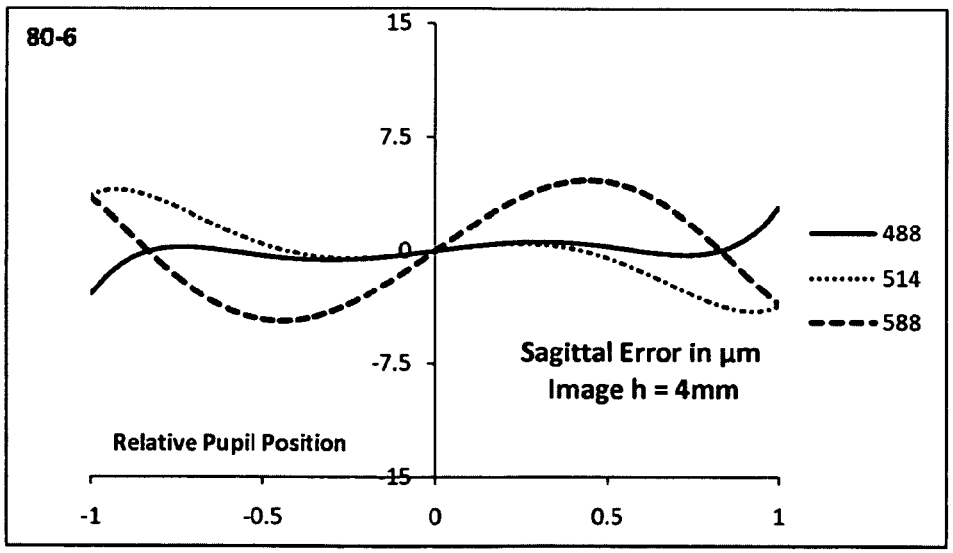
Figure 4F:
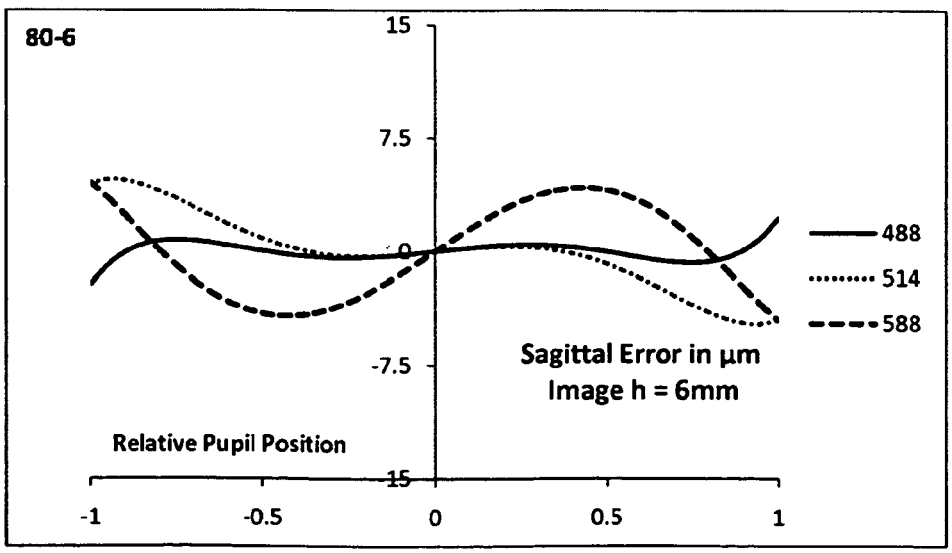
Figure 6A:
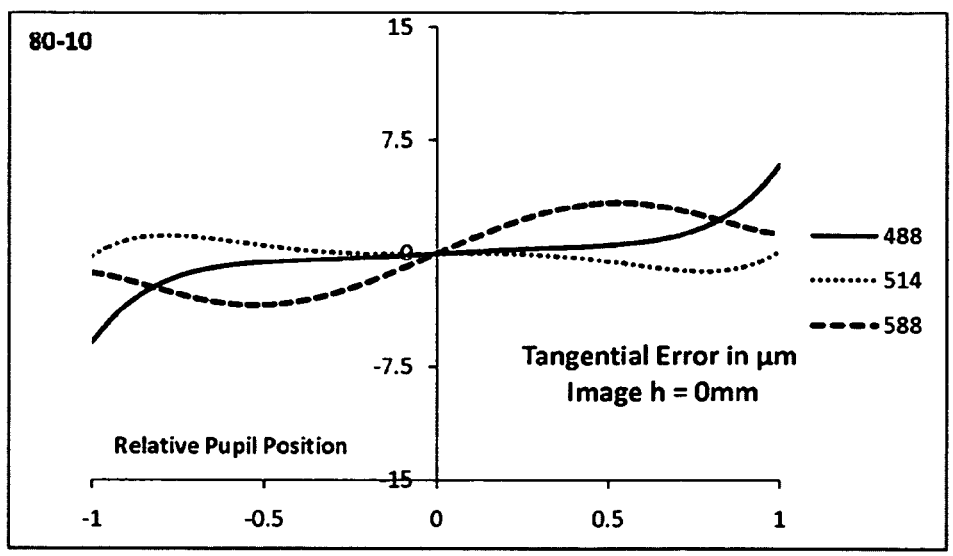
FIGS. 6A through 6F display the ray-intercept plots of the third embodiment of FIGS. 5A and 5B of the lens with paraxial magnification of −0.1.
Figure 6B:
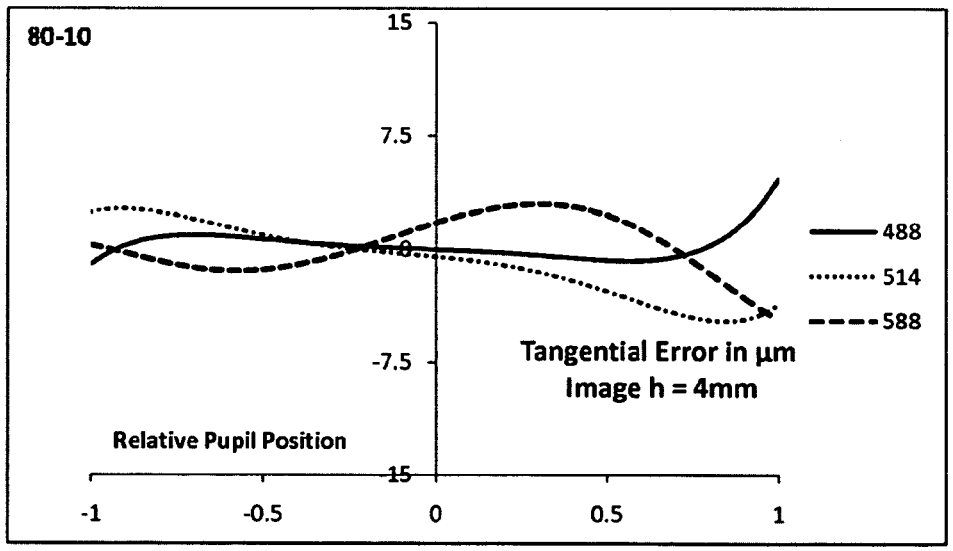
Figure 6C:
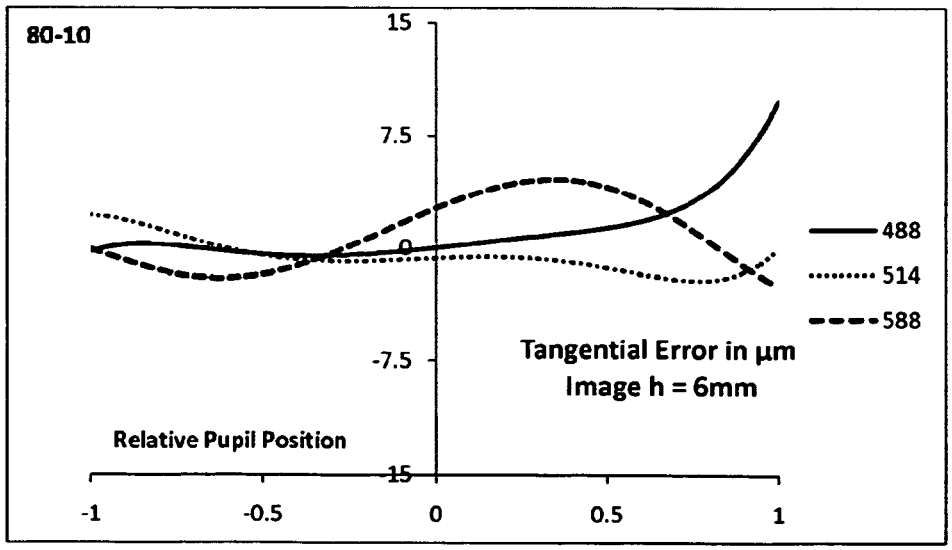
Figure 6D:
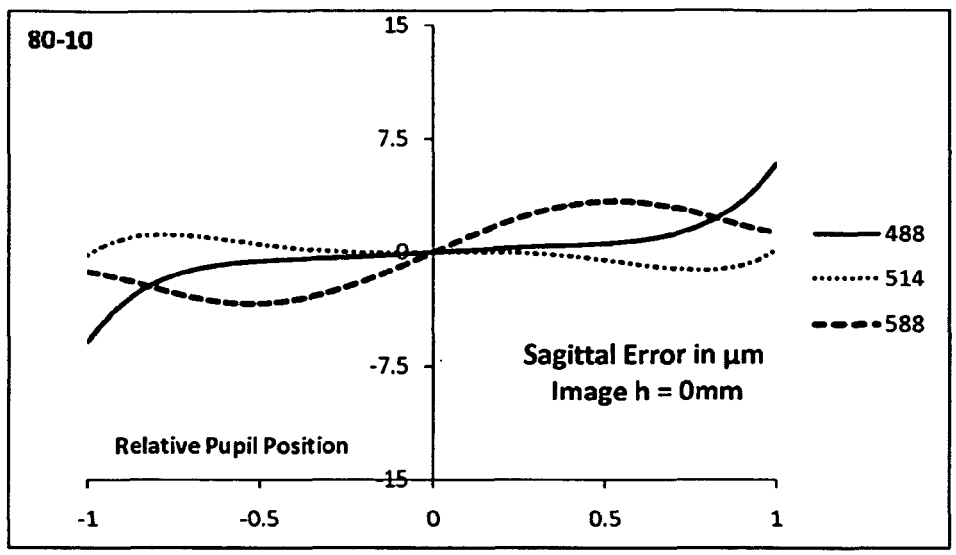
Figure 6E:
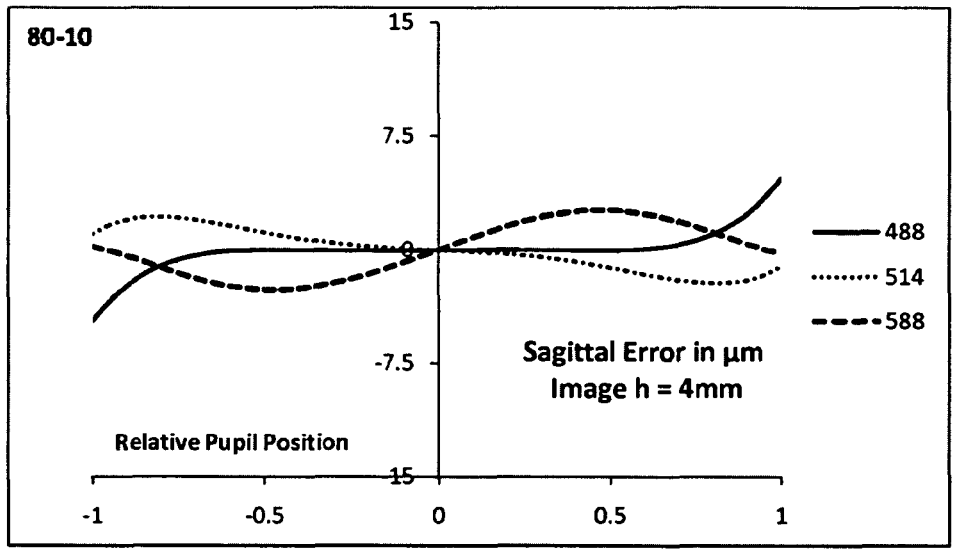
Figure 6F:
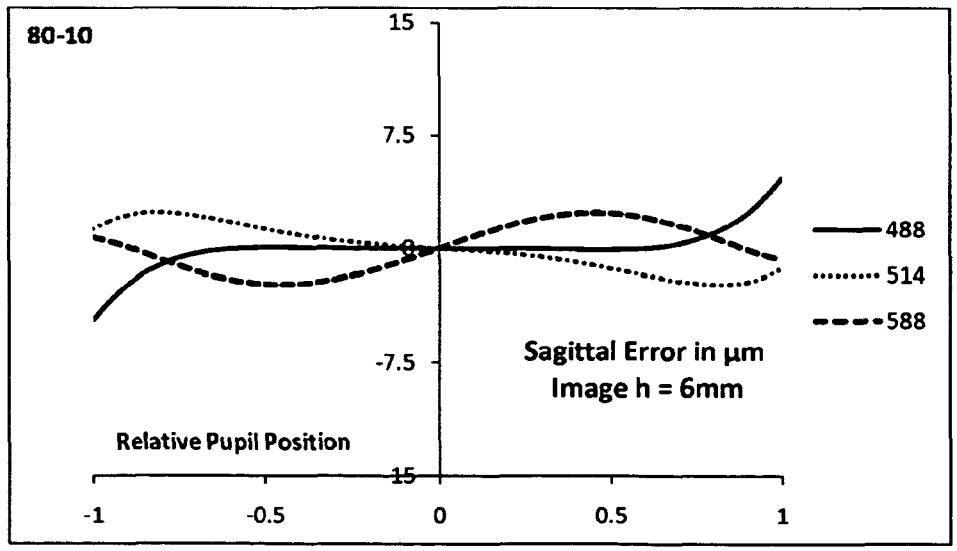

The ray intercepts of the first and second embodiments display consistency in both shape and magnitude. The blue 488 and green 514 wavelengths display both third and fifth order polynomials while the red 588 shows only third order polynomials. The axial color is indicated by the slope at the origin. The flat slope of the blue 488 and green 514 wavelengths indicate focus at the sensor while the positive slope of the red 588 wavelength indicates focus beyond the sensor. The red 588 wavelength is considered less important than the blue 488 and green 524 wavelengths because the emission of a flourophore drops rapidly with wavelength. Collection of light beyond a range of 50 nm in wavelength is only marginally productive in fluorescent applications. FIG. 3C displays the limitations of the lens to a magnification of −0.5. The green 514 wavelength at a field height of 4.0 mm extends beyond a pixel width 7.5 um. This problem grows as the magnification tends towards −1.0. Ergo, the design is directed to a magnification of −0.5. Application of an aspheric profile to the front surface 11 of the first group G1 eliminates this problem. It also permits extension of magnification from −0.5 to −1.0. As seen in FIG. 4, the magnitude of the aberration decreases at a magnification −0.1. The design can certainly be extended beyond −0.1, but total length becomes an issue. At 1500 mm in length, the second embodiment is rather long. The bulk of the length of the second is due to the object distance of 1300 mm.

The third embodiment achieves a −0.1 magnification without exceeding 1000 mm through the addition of a third group G3. The third group G3 should be placed midway between the front object point 75 of the first and second groups G1 and G2 and the lens-stop LS. This condition maintains the rays within a consistent diameter in the space between the second and third groups G2 and G3. It also maintains a similar diameter of the elements of the second and third groups G2 and G3. The addition of the third group G3 provides more control of aberrations. Consequently, the ray intercept plots on the third embodiment in FIGS. 6A through 6F display smaller aberration than the first and second embodiments. The ray intercepts are well within a 7.5 um pixel, and there is much less fifth order aberration. The object distance on the third embodiment is 600 mm while the length is 1000 mm.

All three embodiments include some important features for consistent manufacture. Due to the length of the optical system, the radii of the surfaces are also long. This facilitates decentering of the elements. However, the wavelengths do not scale. The thickness of the elements must be carefully controlled to minimize axial color and lateral color. The plano interface 12 of the first group G1 facilitates accurate fabrication of the doublet of the first group DG1. The plano surface 32 of the doublet of the third group DG3 provides similar benefits. The plano surface 12 of both L1G1 and L2G1 can be ground to a precise thickness without introduction of a wedge with the elements. Furthermore, an exposed portion of surface 11 serves as a flange 64 for accurate mounting of DG1 to the camera body. The doublet of the second group DG2 requires a spherical interface for correction of axial color and spherical aberration. The second lens of the second group L2G2 is specified as biconvex with equal but opposite curvatures. The equality of the curvatures facilitates fabrication because the surface with greater surface form error can be bonded to the third lens of the second group L3G2. The errors of the bonded surface will create smaller aberrations when mounted to another glass surface as opposed to an interface with air. The smaller change of index reduces the effects of fabrication errors. The geometries of the current embodiment promote cost effective manufacture, but other forms are certainly within the scope of the invention.

The first group G1 provides effective management of the chief ray 52 angle, field curvature, and astigmatism through just three degrees of freedom: the front surface 11 of power, the back surface 13 of power, and the separation between them. In Tables 1B, 2B, and 3B, the effects of surfaces 11 and 13 upon astigmatism and field curvature are easily seen. These surfaces eliminate the astigmatism and field curvature of the second group G2 without the addition of spherical aberration. The first group is a significant source of coma. However, the second group effectively manages coma through shape and materials.

The refractive indexes of the first, second, and third embodiments are listed in Tables 1A 2A and 3A. The refractive indexes at wavelengths of 488, 514, and 588 are cited. Ordinarily, the Abbe number V is based upon wavelength at 486, 588, and 656 nm wherein a low-dispersion glass would display an Abbe number of 70, and high-dispersion glass would display an Abbe number of 20. Adaptation of the Abbe number to the reduced spectrum yields the following expression for the Abbe number for the reduced spectrum:

$$V' = \frac{n_{514}}{n_{488} - n_{588}}.$$

Tables 1A, 2A and 3A provide Abbe numbers for the reduced spectrum as 75 or greater. Ergo, through reduction of the Abbe wavelength spectrum from 170 nm to 100 nm, all glasses within the embodiments disclosed herein qualify as low-dispersion material. Consequently, correction of axial color is easily managed by a doublet of the second group DG2, and surface 25 is left plano for advantage in manufacture.

The materials of Tables 1A, 2A and 3A represent three combinations of glass types. The materials with S as a prefix are available from Ohara Corporation of Rancho Santa Margarita, Calif. The S designates environmentally "safe" due to the absence of lead and arsenic. Silica is a standard substrate for filters sold under the registered trademark SEMROCK of Semrock, Inc. of Rochester, N.Y. D-263 is available from SCHOTT North America, Inc. of Elmsford, N.Y. D-263 is an extremely pure mixture of boron oxide and silica. Such purity yields low scattering and low intrinsic fluorescence; both of which are highly desirable in low-light applications. Silica offers similar features to D-263. D-263 and silica are common choices for the glass cover C in CCD sensors.

The small angles of incidence at the filter F indicate a zone of distant image conjugate between L1G1 and L2G2. The infinitely distant conjugate is an important feature of the tube zone within modern microscopes, but this effective feature has not been implemented in camera lenses. A typical double Gauss camera lens does not display a zone of distant conjugate in its structure. A departure for the traditional double Gauss structure permits placement of the filter F within a zone of distant image conjugate. As seen in Tables 1B, 2B, and 3B, the aberrations of the filter F (surfaces 3 and 4) are not only small, but, more importantly, they are also equal in magnitude but opposite in sign. Therefore, a plano filter does not create any net aberrations, and a plurality of filter combinations is possible without the creation of significant aberration. The filter thickness can vary from 4 to 12 mm, wherein the lower limit is necessary to preventing warping of the filter at the 60 mm diameter. Silica is an effective material for filters, while other glass types are certainly possible and within the scope of the invention.

A filter F may be placed within the second group G2. The filter F is nominally placed in between the first lens L1G2 of the second group and the doublet DG2 of the second group. The image conjugate is distant by design within this zone. Placement on none, one, two, or more filters will not adversely affect focus or Seidel aberrations. The surface form errors of the filters must be seriously considered. A complex interference will tend warp a filter. A 60 mm filter should be fabricated on 4-6 mm of silica to insure a minimum of surface form error. Placement of the filter with G2 also creates a constraint upon the front focal length 72 of the first group G1. The chief ray 52 angle must not exceed 4.0 degrees within the second group. This indicates a front focal length of the first group as 14 times the sensor height. As described below, this limits the wavelength shift of the filter to 0.24% of the wavelength. In Tables 1B, 2B and 3B, the maximum filter angle of incidence MFAI is less than 4.0 degrees.

The shift in wavelength spectrum of an interference filter is described by $$\lambda' = \lambda \cos \theta.$$

It is frequently called a "blue shift," because the filter spectrum shifts to shorter wavelengths when tilted. Wherein, $\theta$ is the angle of incidence, $\lambda$ is the spectral position at normal incidence, and $\lambda'$ is the spectral position at incidence angle $\theta$. A 0.2% shift in wavelength from 500 to 505 nm occurs at a 3.6° angle of incidence. A 1.0% shift in wavelength from 500 to 505 nm occurs at an 8.1° angle of incidence. A shift of 1 nm is highly desirable, whereas a 5 nm shift would reject precious photons. The maximum filter angle of incidence MFAI is set as 4.0° for both embodiments. A 4.0° angle of incidence indicates a 0.24% spectral shift, which represents a 1.2 nm shift from 500 to 501.2 nm. This limit of 4.0° defines a zone of collimation, which has other advantages as describe below.

The lens stop LS is located near second group G2. The diameter of the lens-stop LS is approximately 50 mm for all embodiments. Therefore, a diameter of 60 mm is chosen for the second and third groups G2 and G3 where there is sufficient space at the margin for mounting flanges and retainer rings. An optical element with a clear aperture of 50 mm in diameter can be easily manufactured with surface-form error within a one-tenth wavelength at 500 nm. A scaled configuration of the lens is certainly possible; however, the wavelength does not scale. Consequently, the manufacturing methods cannot easily maintain a surface-form error within a tenth of a wavelength at 500 nm on diameters of greater than 50 mm for the clear aperture.

The first, second, and third embodiments display similar shapes as described herein, but their object fields are significantly different. This indicates the versatility of the design in adaptation to specific applications. A plurality of designs exists for exploiting the novel features and benefits of the lens.

The performance of the lens may be enhanced through application of aspheric profiles to the convex surfaces of first lens L1G1 of the first group and first lens L1G2 of the second group. Distortion may be reduced to below 0.1% by an aspheric profile on the first lens L1G1 of the first group. Spherical aberration may be reduced by application of an aspheric profile to the first lens L1G2 of the second group. The plano surfaces of these elements facilitate fabrication of an aspheric surface on the opposite surface from the plano surface. The plano surface enables grinding of aspheric surfaces on glass.

Fabrication of aspheric surfaces requires careful selection of materials. The material must be soft enough to grind without scratching. The Knoop Hardness Hk indicates resistance to grinding, while the abrasion resistance Aa indicates resistance to scratches. The ratio of the Knoop hardness to the abrasion resistance should be in the range of 3-4. Acceptable materials for this requirement are LAL7, LAL12, LAM2, LAM3, and silica. The second surface 22 of the second group should be an even aspheric with finite coefficients for only $r^4$. The first surface 11 of the first group should be an even aspheric with finite coefficients for $r^4$, and $r^6$, possibly $r^8$ and $r^{10}$.

Other configurations are possible with relaxation of some requirements. Through expansion of the pixel to 20 microns, the lens may function with an image F-number of 2.0. By increasing the image F-number to 4.0, the lens may function at a magnification of −1.0. Consequently the lens may operate with an image F-number of 4.0 within a magnification range of −0.1 to −1.0. The lens may also be adapted to c-mount with 31/32 inch interndal diameter and 0.69-inch optical distance to the sensor.

Conditions upon geometry. The form of the lens can be described through eight conditions upon geometry. They refer to easily obtained measurements of physical parameters. The eight conditions upon geometry are based upon the image F-number 62 and the sensor height 61 at an optical distance 71 between the front surface 11 of the first group G1 and the sensor S.

A first condition specifies that the rays 50 of the center of the sensor S are separated from the rays 51 of the margin of the sensor S within the first group G1. The separation of rays within the second group is essential for effective control over astigmatism, field curvature, and the angle of the chief ray 52 at the image. The separation of rays within the first group is achieved when the diameter of the rays 50 of the center of the field does not exceed the sensor height 61. The first condition may also be expressed wherein the optical distance 71 between the front surface 11 of the first group G1 and the sensor S equals not greater than approximately the sensor height 61 times image F-number 62. The first essential condition is derived geometrically.

A second condition specifies the shape of the doublet of the first group DG1 as a positive meniscus wherein the front surface 11 has a positive optical power and the back surface 13 has a negative optical power. As the distance between theses surfaces 11 and 13 decreases, the optical power also decreases. Consequently, the optical power near the margin is less than the optical power at the center due to a smaller distance between surfaces at the margin. The smaller power in the margin extends the focus of the rays 51 of the margin. This extension of focus for the rays 51 of the margin adds negative field curvature, which may flatten or counter the positive field curvature of an incident image upon the first group DG1 as seen in FIG. 5A. As a convention within the tables for Seidel aberrations, a positive Petzval radius is described by a negative curvature. Therefore, the positive Petzval radius of an incident image may be flattened by a negative curvature of the first group.

A third condition specifies the radius 72 of the front surface 11 of the first group G1 as approximately equal to 1.0 times the optical distance between the front surface 11 of the first group G1 and the sensor S. In this context, the term approximately shall mean within 20%. This condition defines the front surface as convex with a small effect upon spherical aberration.

A fourth condition specifies the radius 73 of the back surface 13 of the first group G1 as at least equal to 1.0 times the optical distance between the back surface 13 of the first group G1 and the sensor S. This condition defines the back surface as concave with a small divergent effect that minimizes spherical aberration. The third and fourth conditions define the doublet of the first group DG1 as a positive meniscus with limited optical power.

Beyond the limits of the third and fourth conditions, the benefits of a meniscus lens are still achieved. However the fabrication and assembly tolerances become more difficult. Consequently the spirit of the invention exists beyond the stated limits of the third and fourth conditions.

A fifth condition specifies the angle of the chief ray 52 within the second group G2 as at most 4.0 degrees from the optical axis 53. This limits the spectral shift of a filter F to less than 0.25% as defined by the blue shift at 4 degrees. Geometrically, the fifth condition indicates a front focal length 72 of the first group G1 as at least 14 times the sensor height 61.

A sixth condition indicates overlap of the rays by field within the second group G2. Geometrically, the fifth condition places the second group G2 near the front focal point 72 of the first group G1. The overlap rays by field within the second group G2 enable the second group G2 to manage spherical aberration, axial color, and coma.

A seventh condition specifies the lens-stop LS at the front focal point 74 of the first group or the front focal point 75 of the first and second groups G1 and G2. This condition is essential for telecentric image orientation of the chief ray 52 at the sensor S. Thus, a chief ray 52 originating from a front focal point 74 in FIG. 2B or 75 of FIG. 5A of a lens will exit the first group in parallel to the optic axis 52.

An eighth condition specifies an optimum location of the third group G3, which is depicted in FIGS. 5A and 5B. The object field point 76 of the first and second groups G1 and G2 is located by the extension 54 of the rays 50 of the center of the field from the back side 33 of the third group into a focus on the front side of the third group G3. The third group G3 should be placed midway between the lens-stop LS and the object field point 76 of the first and second groups G1 and G2. The eighth condition ensures minimum bending of rays by the third group G3.

With certain details and embodiments of the present invention disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims express certain elements as means for performing a specific function, at times without the recital of structure or material. As the law demands, these claims shall be construed to cover not only the corresponding structure and material expressly described in this specification but also all equivalents thereof.

The invention claimed is:

1. A lens system comprising:
   a first group with a positive meniscus lens, a front surface, and a back surface; and
   a sensor with a height and an image F-number;
   wherein the optical distance between the front surface of the first group and the sensor is not greater than approximately the height of the sensor times the image F-number.

2. The lens system of claim 1 wherein the front surface of the first group has a radius, wherein the back surface of the first group has a radius, and wherein:
   a. the radius of the front surface of the first group equals approximately 1.0 times the optical distance from the front surface of the first group to the sensor; and
   b. the radius of the back surface of the first group equals at least approximately 1.0 times the optical distance from the back surface of the first group to the sensor.

3. The lens system of claim 2 wherein the first group has a front focal length of at least approximately 14 times the sensor height.

4. The lens system of claim 3 wherein the first group has a front focal point, wherein a second group is placed adjacent to the front focal point of the first group, and wherein the first and second group has a front focal point.

5. The lens system of claim 4 further comprising a lens-stop disposed adjacent to the second group.

6. The lens system of claim 5 wherein the lens-stop is substantially coincident with the front focal point of the first group.

7. The lens system of claim 5 wherein the lens-stop is substantially coincident with the front focal point of the first and second groups.

8. The lens system of claim 5 wherein the first and second groups have an object field and further comprising a third group disposed midway between the lens-stop and the object field of the first and second groups.

9. The lens system of claim 1 wherein the first group comprises a first lens of the first group and a second lens of the first group.

10. The lens system of claim 9 wherein the first lens of the first group is plano convex and the second lens of the first group is plano concave.

11. The lens system of claim 10 wherein the first lens of the first group and the second lens of the first group form a doublet of the first group with a junction at plano surfaces of the first and second lenses of the first group.

12. The lens system of claim 11 wherein the plano surface of first lens of the first group is exposed as a flange.

13. The lens system of claim 4 wherein the second group comprises a first lens of the second group, a second lens of the second group, and a third lens of the second group.

14. The lens system of claim 13 wherein the first lens of the second group is plano convex.

15. The lens system of claim 14 wherein the second lens of the second group is biconvex and the third lens of the second group is plano concave.

16. The lens system of claim 15 wherein the second lens of the second group and the third lens of the second group form a doublet of the second group with a junction at spherical surfaces of the second and third lenses of the second group.

17. The lens system of claim 16 further comprising a filter disposed between the first lens of the second group and the doublet of the second group.

18. The lens system of claim 8 wherein the third group comprises a first lens of the third group and a second lens of the third group.

19. The lens system of claim 18 wherein the first lens of the third group is plano convex and the second lens of the third group is plano concave.

20. The lens system of claim 19 wherein the first lens of the third group and the second lens of the third group form a doublet of the third group with a junction at plano surfaces of the first and second lenses of the third group.

21. The lens system of claim 4 wherein the second group has an effective diameter of not greater than approximately 60 mm.

22. The lens system of claim 8 wherein the third group has an effective diameter of not greater than approximately 60 mm.

23. The lens system of claim 4 wherein the lens system has a paraxial magnification between approximately −0.5 and approximately −0.1.

24. The lens system of claim 8 wherein the lens system has a paraxial magnification between approximately −0.1 and approximately −0.05.

25. The lens system of claim 1 wherein the front surface of the first group is defined by an aspheric profile.

26. The lens system of claim 4 wherein a surface of the second group is defined by an aspheric profile.

27. The lens system of claim 4 wherein a convex surface of the front lens of the second group is defined by an aspheric profile.

* * * * *